United States Patent [19]

Imamura et al.

[11] Patent Number: 5,085,301
[45] Date of Patent: Feb. 4, 1992

[54] LOCKUP CONTROL DEVICE OF A FLUID TRANSMISSION

[75] Inventors: Hiroyuki Imamura; Takafumi Kurata; Hiroaki Yokota, all of Shizuoka; Naoyuki Noguchi, Hiroshima, all of Japan

[73] Assignees: Mazda Motor Corporation, Hiroshima; Jatco Corporation, Shizuoka, both of Japan

[21] Appl. No.: 589,783

[22] Filed: Sep. 26, 1990

[51] Int. Cl.⁵ .................... B60K 41/02; F16H 45/02
[52] U.S. Cl. ................... 192/0.076; 192/3.31
[58] Field of Search ............ 192/3.3, 0.076, 3.31

[56] References Cited

U.S. PATENT DOCUMENTS

| | | | |
|---|---|---|---|
| 4,872,540 | 10/1989 | Sekine et al. | 192/0.076 |
| 4,940,122 | 7/1990 | Fujieda | 192/3.3 X |
| 4,953,679 | 9/1990 | Okino | 192/3.3 X |
| 4,957,194 | 9/1990 | Sawa et al. | 192/3.3 X |

FOREIGN PATENT DOCUMENTS

| | | | |
|---|---|---|---|
| 57-33253 | 8/1955 | Japan. | |
| 57-184754 | 5/1956 | Japan. | |
| 0179566 | 9/1985 | Japan | 192/3.3 |
| 0119870 | 6/1986 | Japan | 192/3.3 |
| 0206867 | 9/1986 | Japan | 192/3.3 |
| 0124355 | 6/1987 | Japan | 192/3.3 |
| 0159856 | 7/1987 | Japan | 192/3.3 |
| 0246657 | 10/1987 | Japan | 192/3.3 |

OTHER PUBLICATIONS 63-47855 Japanese Patent Application Abstract from Laying Open Gazette of Nov. 30, 1989.
62-269991 Japanese Patent Application Abstract from Laying Open Gazette of Jul. 27, 1989.
59-238549 Japanese Application Abstract from Laying Open Gazette of Oct. 18, 1989.
63-32499 Japanese Patent Application Abstract from Laying Open Gazette of Nov. 10, 1989.
58-167428 Japanese Patent Application Abstract from Laying Open Gazette of Aug. 10, 1985.
59-32663 Japanese Patent Application Abstract from Laying Open Gazette of Jan. 28, 1986.

Primary Examiner—Rodney H. Bonck
Attorney, Agent, or Firm—Sixbey, Friedman, Leedom & Ferguson, Jr.

[57] ABSTRACT

According to the lockup device of a fluid transmission under the present invention, at the decelerating running when the change rate of engine load exceeds a set value, a lockup control pattern is changed so that the area where the lockup device is controlled to perfect friction or to the specified friction force. By this change, at the decelerating running large engine brake force can be worked and a good feeling of deceleration can be given to a driver. In the case where fuel supply to the engine is suspended at the decelerating running of the engine, transmission of large engine brake force as mentioned above results in comparatively longer time of maintaining high engine speed and longer time of fuel supply cutting off, with consequent saving of fuel consumption. Moreover, by changing the target slip quantity to the increasing side at the accelerating running, torque increasing action at the accelerating running is displayed effectively and accelerability can be improved. At the normal running, lowering of specific fuel consumption due to slip of the torque converter can be checked by setting a target slip quantity small. Thus, coexistence of improvement of accelerability and improvement of specific fuel consumption can be planned.

24 Claims, 8 Drawing Sheets

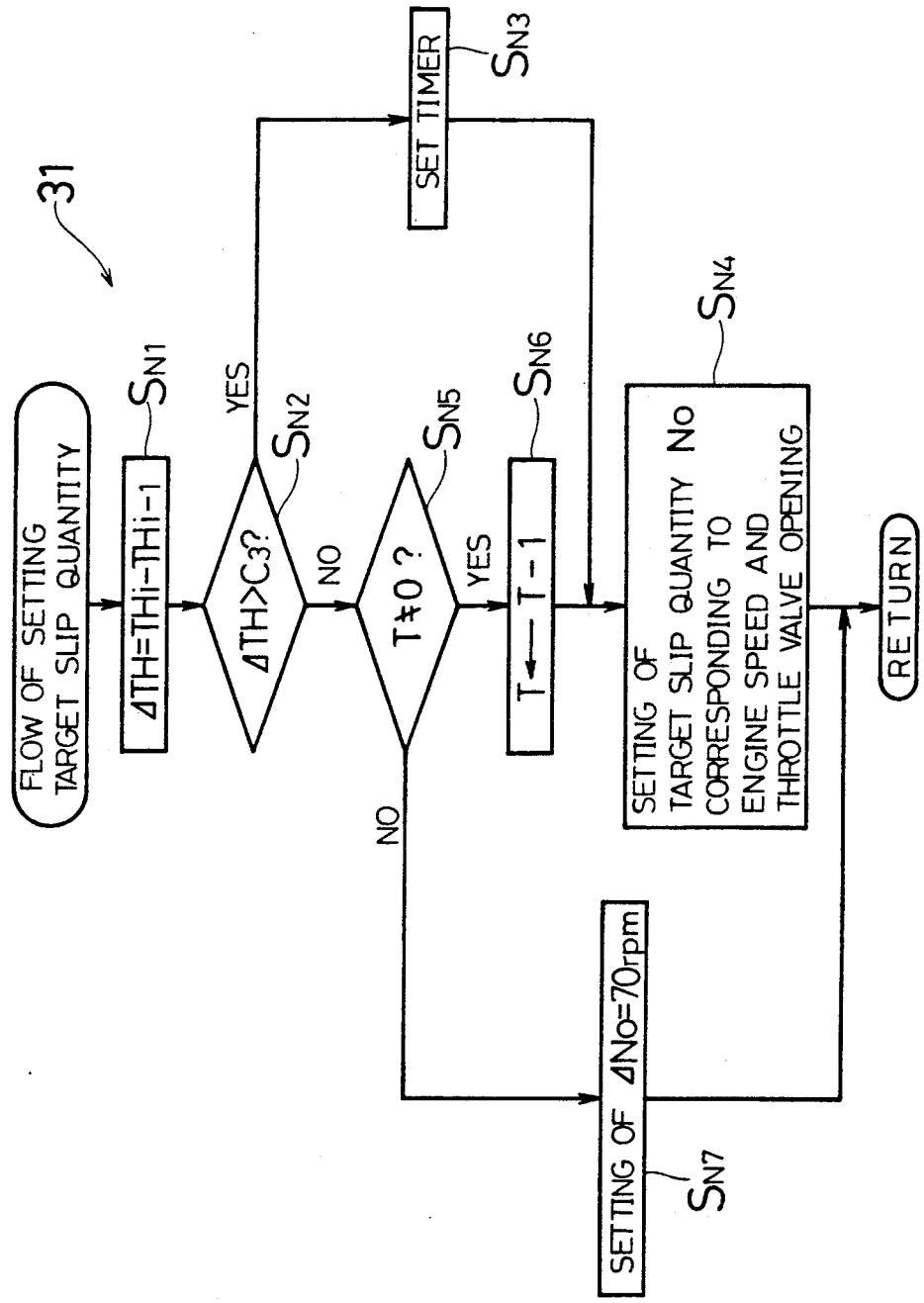

LOCKUP CONTROL DEVICE OF A FLUID TRANSMISSION

BACKGROUND OF THE INVENTION

1. Field of the Invention

This invention relates to an improvement of a lockup control device having a locking up mechanism to connect an input shaft directly with an output shaft in a fluid transmission, such as a torque converter.

2. Description of the Prior Art

In the conventional fluid transmission having such a locking up mechanism as mentioned above, friction and release of a locking up mechanism are controlled on the basis of preset control patterns. For example, the Japanese Patent Application Laying Open Gazette No. 57-184754 discloses control patterns of an automatic transmission including a locking up mechanism control pattern. According to this disclosure, two kinds of pattern, namely, an output demand pattern and a specific fuel consumption priority pattern, are set beforehand and at the time of acceleration demand when the speed of stepping on an accelerator pedal exceeds a set value, an output demand pattern is selected compulsorily to improve accelerability of a vehicle.

Also, the Japanese Patent Application Laying Open Gazette No. 57-33253 discloses a system whereby the number of revolutions of an input shaft and that of an output shaft of a torque conventer are detected and the locking up mechanism is so controlled that when the difference in the number of revolutions between the input shaft and the output shaft in the predetermined specific running area exceeds a target slip quantity, its frictional force becomes larger but while the difference in the number of revolutions is less than the target slip quantity, its frictional force is small and thus the difference in the number of revolutions is adjusted to the target slip quantity.

However, in the engine provided with such fluid transmission as mentioned above, at the deceleration running when the throttle value valve is closed and the engine running state is not in the specific running area where frictional force of the locking up mechanism is controlled, engine brake force works only through the fluid transmission and such engine brake force decreases by slip in the fluid transmission. Therefore, the desired decelerating effect cannot be obtained and a driver does not have a good feeling of deceleration.

It is suggested that in the case where a target slip quantity between an input shaft and an output shaft of a torque converter is set, by setting it variable according to the engine speed (r.p.m.) and the throttle valve opening (for example, small slip quantity for a small throttle valve opening and a large slip quantity for a large throttle valve opening), improvement of accelerating capacity can be made at the accelerating running when the throttle valve opens large due to the torque increasing action of the torque converter. According to this suggestion, since there are cases where acceleration is effected from a small opening of a throttle valve and the normal running is maintained at a large opening of the throttle valve, it is possible to suppress the reduction in specific fuel consumption caused by slip of a torque converter (because at the accelerating running from a small opening of the throttle valve, the locking up mechanism is substantially in direct connection state), but torque increasing action of the torque converter cannot be displayed effectively and accelerating capacity lowers. Also, during the normal running at large opening of the throttle valve, specific fuel consumption worsens due to large slip quantity.

The present invention refers to a fluid transmission provided with a locking up mechanism. The first invention of the present application has for its object to obtain the desired deceleration effect by working as large engine brake force as possible by using a locking up mechanism at the specified decelerating running when the engine load decreases. The second invention of the present application has for its object to plan coexistance of accelerability and specific fuel consumption.

In order to attain the above objects, in the first invention at the decelerating running the locking up mechanism is caused to put out large frictional force so as to prevent decline of engine brake force due to slip of the fluid transmission. In the second invention, the change of engine load is detected and according to such change rate, whether accelerating running or normal running is judged and a target slip quantity is set.

Concretely, the first invention of the present application has as its prerequisite a lockup control device provided with a lockup device to connect an input shaft directly with an output shaft of a fluid transmission and a control means to control friction and release of the lockup device on the basis of a preset lockup control pattern. It has also a load changing state detecting means to detect the changing state of engine load and a lockup control pattern changing means which, when the change rate of load detected by the load changing state detecting means is more than a negative set value, changes the lockup control pattern of the above control means to the direction in which the large friction force area of the lockup device expands.

The second invention of the present application has as its prerequisite a lockup control device of a fluid transmission provided with a lockup device to connect an input shaft directly with an output shaft of a fluid transmission and a control means to control frictional force of the lockup device so that the difference in the number of revolutions (r.p.m.) between the input shaft and the output shaft of the fluid transmission in the set running area becomes a target slip quantity. It has also a load changing state detecting means to detect the changing state of engine load and a target slip quantity changing means to change the target slip quantity of the above control means to the increasing side when the change rate of load detected by the load changing state detecting means is more than a set value.

By the above composition, in the first invention at the decelerating running when the change rate of engine load becomes more than the negative set value, the lockup control pattern is changed and even in the area where the lockup device is cut off at the normal running, the lockup device is controlled to the perfect friction state or to the specified frictional force and therefore, as compared with the case where engine brake force passes through only the fluid transmission, large engine brake force acts and good feeling of deceleration can be obtained. In the second invention, when the change rate of engine load exceeds a set value, it is judged to be the accelerating running and a target slip quantity is changed to the increasing side. Therefore, torque increasing action of the torque converter is displayed effectively and acceleration capacity is improved.

On the other hand, in the case where the change rate of engine load is less than a set value, it is judged to be the normal running and a target slip quantity is maintained at a set value. If the target slip quantity is set at a small value, good specific fuel consumption can be obtained.

The above objects and novel features of the present invention will be understood more clearly by reading the following description made with reference to the accompanying drawings.

BRIEF DESCRIPTION OF THE DRAWINGS

The accompanying drawings show preferred embodiments of the present invention, in which:

FIG. 5 to FIG. 7 show a lockup control pattern, in which FIG. 5 shows the pattern for normal running, FIG. 6 shows the pattern for accelerating running and FIG. 7 shows the pattern for decelerating running;

FIG. 8 shows a flow chart of setting a target slip quantity;

DETAILED DESCRIPTION OF THE INVENTION

A description is made below about preferred embodiments of the present invention, with reference to the accompanying drawings.

Figure 1:
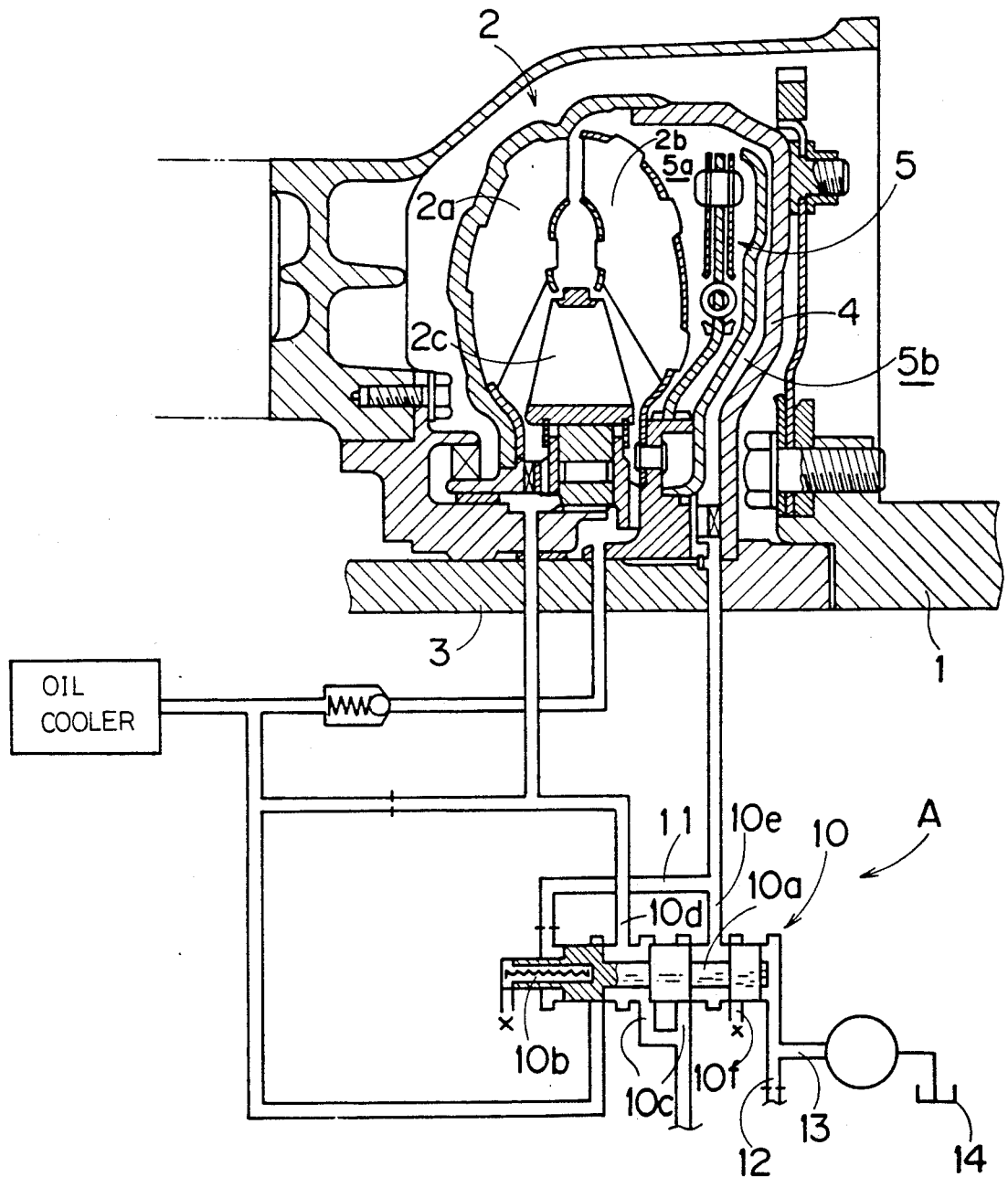
FIG. 1 is an oil pressure circuit diagram for working a lockup clutch.

FIG. 1 shows the construction and an oil pressure circuit of a torque converter part of an automatic transmission. In FIG. 1, reference numeral 1 designates an engine output shaft and reference numeral 2 designates a torque converter (as a fluid transmission which transmits motive power of the engine output shaft 1 to the succeeding stage). The torque converter 2 has a pump 2a which is connected rotatably to the engine output shaft 1, a turbine 2b which is arranged opposite to the pump 2a and a stator 2c which is disposed between the pump 2a and the turbine 2b and does torque increasing action. A front end portion of a converter output shaft 3 is connected to the turbine 2b. Connected to a rear end portion of the converter output shaft 3 is, for example, a planetary speed-shift gear mechanism (not shown in the drawing) of forward fourstages and backward one stage.

In the above torque converter 2, a lockup clutch 5 (as a lockup device which connects the engine output shaft 1 directly with the converter output shaft 3) is arranged between the turbine 2b and a converter case 4. The lockup clutch 5 is biassed in friction direction (rightward in the drawing) by oil pressure of an oil pressure chamber 5a on the friction side which is located in the rear thereof. On the contrary, the lockup clutch 5 is biassed in releasing direction by oil pressure of another oil pressure chamber 5b located in front thereof.

An oil pressure control circuit A has a function of controlling friction, release and frictional force of the lockup clutch 5. In the pressure control circuit A, reference numeral 10 designates a lockup control valve which regulates supply of oil to the lockup clutch 5.

The lockup control valve 10 has a spool 10a which slides right and left in the drawing, a spring 10b which biasses the spool 10a rightward in the drawing, a line pressure introducing port 10c in which line pressure is introduced and a line pressure supplying port 10d which communicates with the introducing port 10c and supplies line pressure. The line pressure supplying port 10d communicates with the oil pressure chamber 5a on the friction side of the lockup clutch 5. The lockup control valve 10 has also a pressure regulating port 10e which communicates with the oil pressure chamber 5b on the increasing side of the lockup clutch 5 and a tank port 10f. Oil pressure $P_1$ of the pressure regulating port 10e acts on the left end of the spool 10a through the medium of an oil pressure passage 11. Oil is supplied to the right end (in the drawing) of the spool 10a through the medium of an oil pressure passage 12. A tank 14 is connected to the oil pressure passage 12 via a tank passage 13. A duty electromagnetic valve SOL which opens and closes the tank passage 13 is arranged in the intermediate part of the tank passage 13.

The duty electromagnetic valve SOL keeps the tank passage 13 open while the duty rate D is 100% but keeps the tank passage 13 closed while the duty rate D is 0%. By regulating the duty rate D, the opening rate of the oil pressure passage 12 in regulation to the tank 14 is regulated. Thus, the duty electromagnetic valve SOL has a function of regulating the oil pressure $P_0$ of the oil pressure passage 12 to the oil pressure corresponding to the duty rate D. By moving the spool 10a right or left by the relative magnitude of the oil pressure acting on the right end of the spool 10a (namely, oil pressure $P_0$ of the oil pressure passage 12) and the oil pressure acting on the left end of the spool 10a (namely, oil pressure $P_1$ of the pressure regulating port 10e+biassing force of the spring 10b), the pressure regulating port 10e is caused to communicate with the line pressure introducing port 10c and the tank port 10f alternately and finally oil pressure $P_1$ of the pressure regulating port 10e (namely, releasing oil pressure of the lockup clutch 5) is made into the oil pressure corresponding to the oil pressure $P_0$ of the oil pressure passage 12 so as to regulate frictional force of the lockup clutch 5. Therefore, in the case where the duty rate D is 100%, action of releasing oil pressure is removed so as to lock fully the lockup clutch 5 by the maximum frictional force but with gradual lowering of the duty rate D, frictional force will decrease gradually and in the case where the duty rate is 0%, releasing oil pressure is raised to the maximum value so as to release the lockup clutch 5 completely.

Figure 2:
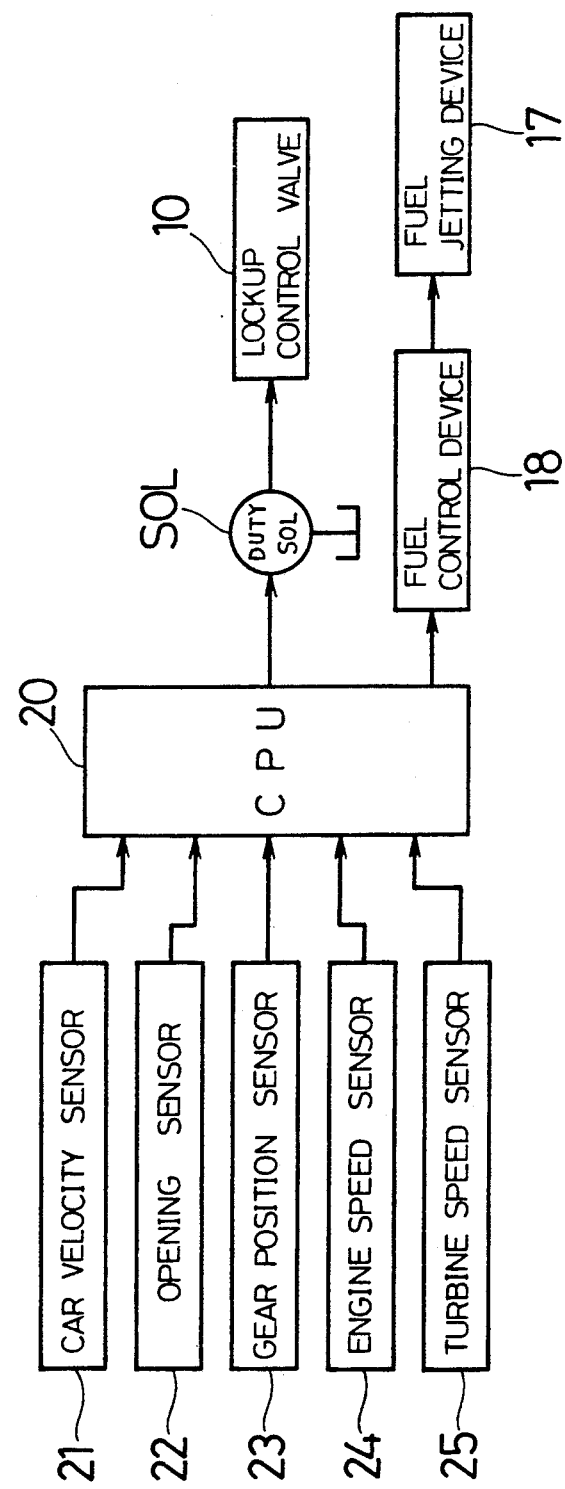
FIG. 2 is a block diagram of a composition of controlling the oil pressure circuit.

FIG. 2 shows a basic electric circuit composition to control frictional force of the lockup clutch 5. In FIG. 2 reference numeral 17 designates a fuel injecting device to inject fuel to the engine. Reference numeral 18 designates a fuel control device to control injection of fuel from the fuel injecting device 17. Reference numeral 20 designates CPU. Inputted to the CPU 20 are detecting signals from a car velocity sensor 21 which detects car velocity, an opening sensor 22 which detects the opening of the throttle valve, a gear position sensor 23 which detects the existing gear position, an engine speed sensor 24 which detects the number of revolutions of the engine and a turbine speed sensor 25 which detects the number of revolutions of the turbine. Stored beforehand in the CPU 20 is a basic lockup control pattern shown in FIG. 5 with regard to friction, release and frictional force of the lockup clutch 5. In this lockup control pattern, an engine running area which is decided by the car velocity and the throttle valve opening is divided into a torque converter area where the running area is below the specified car velocity $V_0$ (about 60 km/h in FIG. 5) and the lockup clutch 5 is released, a lockup area where the running area exceeds the specified car velocity $V_0$ and the lockup clutch 5 is locked and a slip control area which is a part of the torque converter area where the throttle valve opening is small and the lockup clutch 5 is controlled (slip control) to the specified frictional force. The CPU 20 outputs a command signal to the fuel control device 18 so as to stop fuel injection from the fuel injecting device 17 at the time of decelerating running when the opening of the throttle valve detected by the opening sensor 22 decreases and the engine speed is comparatively high.

Figure 3:
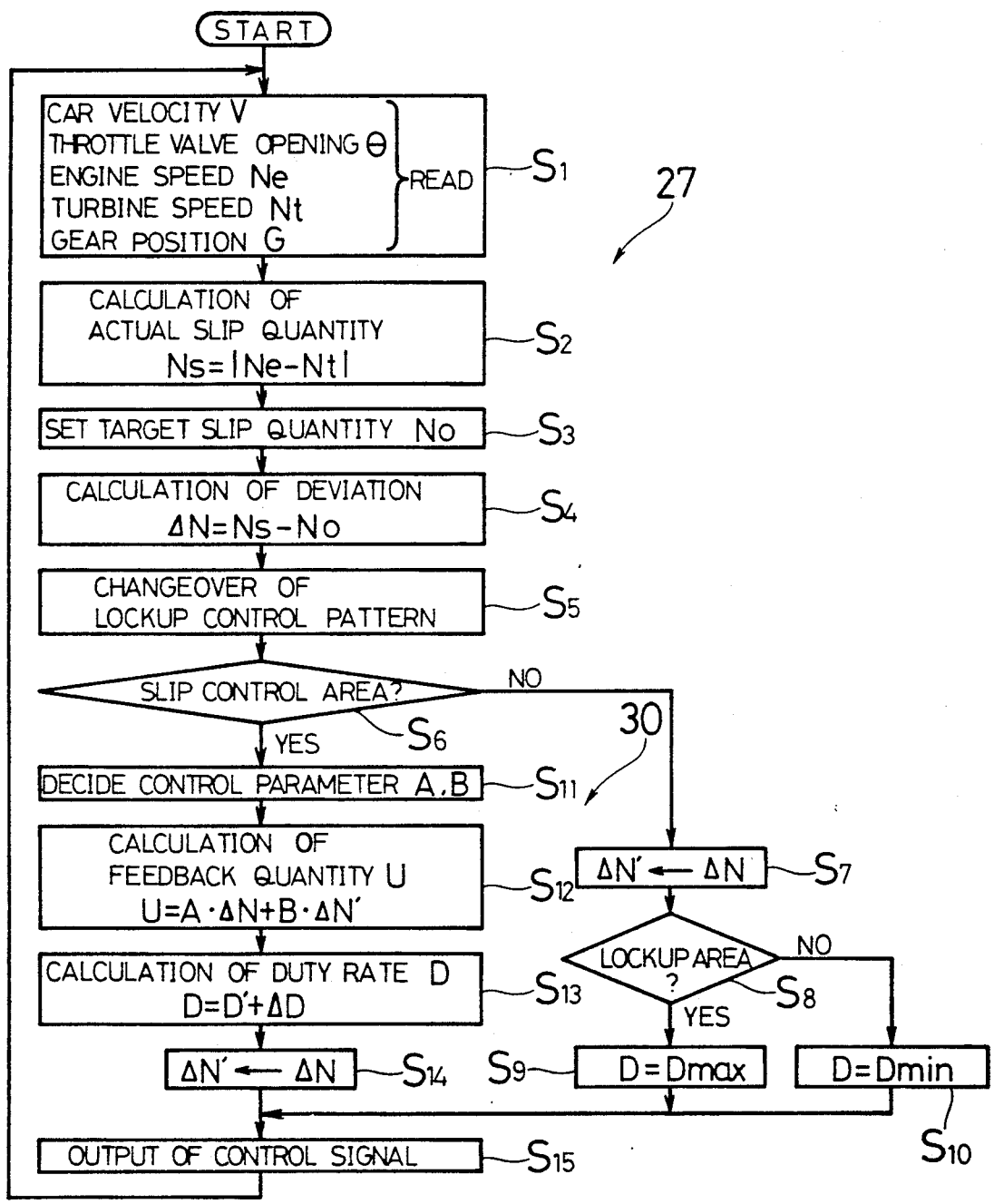
FIG. 3 is a flow chart showing the concrete control of the oil pressure circuit.

Control on friction, release and frictional force of the lockup clutch 5 is explained below, on the basis of a control flow of FIG. 3.

Upon starting, at the step $S_1$ car velocity, throttle valve opening $\theta$, engine speed Ne, turbine speed Nt and gear position G are read and at the step $S_2$ the difference between the engine speed Ne and the turbine speed Nt (namely, actual slip quantity Ns (Ns=|Ne−Nt|) between the input shaft and the output shaft of the torque converter 2, is calculated. At the step $S_3$, a target slip quantity $N_0$ is set on the basis of the flow chart of setting a target slip quantity in FIG. 8. Then, at the step $S_4$ the deviation $\Delta N$ ($\Delta N = Ns - N_0$) between the actual slip quantity Ns and the target slip quantity $N_0$ is calculated. Then, at the step $S_5$ switchover of the lockup control pattern is carried out, on the basis of the sub-routine shown in FIG. 4, to select a lockup control pattern suitable for the running state at that time.

Then, at the step $S_6$ whether or not the engine running state is in the slip control area in the above lockup control pattern selected on the car velocity and the throttle valve opening, is judged. If it is not in the slip control area, at the step $S_7$ the deviation $\Delta N$ of slip quantity of this time is replaced with the preceding value $\Delta N'$ and at the step $S_8$ whether or not the engine running state is in the lockup area in the above selected lockup control pattern, is judged. If it is in the lockup area, at the step $S_9$ the duty rate D is set at the maximum value Dmax to put the lockup clutch 5 in perfect friction state and if it is not in the lockup area, at the step $S_{10}$ the duty rate D is set st the minimum value Dmin to put the lockup clutch 5 in perfect release state.

In the case where at the step $S_6$ the engine running state is in the slip control area, frictional force of the lockup clutch 5 should be controlled, for which the step $S_{11}$ and the following steps are taken to calculate the duty rate D, namely, at the step $S_{11}$ the control parameters A, B for calculating the feedback control quantity U in the slip control are decided and then at the step $S_{12}$ the feedback control quantity U is calculated on the basis of the deviation of slip quantity $\Delta N$ and $\Delta N'$ and under the following formula $$U = A \times \Delta N + B \times \Delta N'$$

At the step $S_{13}$, the duty rate correcting quantity D corresponding to the above feedback control quantity U is read from a map storing such quantities, to which the duty rate D' of the preceding time is added.

Then, at the step $S_{14}$ the deivation of slip quantity $\Delta N$ of this time is replaced with $\Delta N'$ (value of the preceding time) and at the step $S_{15}$ a control signal (duty rate D signal) is outputted to the duty electromagnetic valve SOL and RETURN to $S_1$.

An explanation in made below about the control flow to switchover the lockup control pattern in FIG. 4.

At the step $S_{S1}$, the throttle valve opening TVO and the car velocity are read and at the step $S_{S2}$, the change rate of the throttle valve opening $\Delta$TOV (=TVO−TVO') is calculated from the difference between the throttle valve opening of this time TVO and that of the preceding time TVO'.

Figure 5:
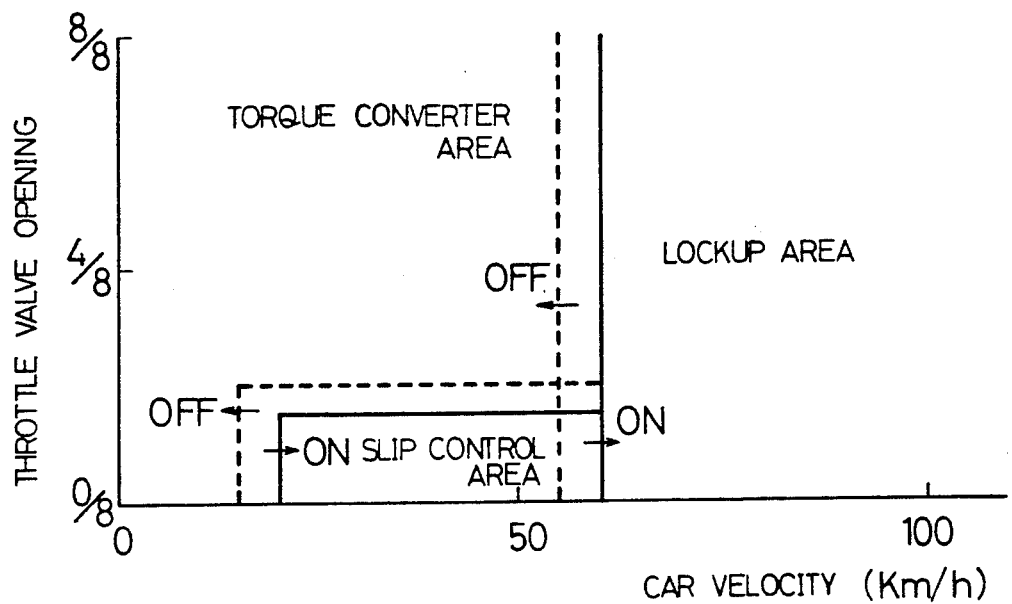
Figure 6:
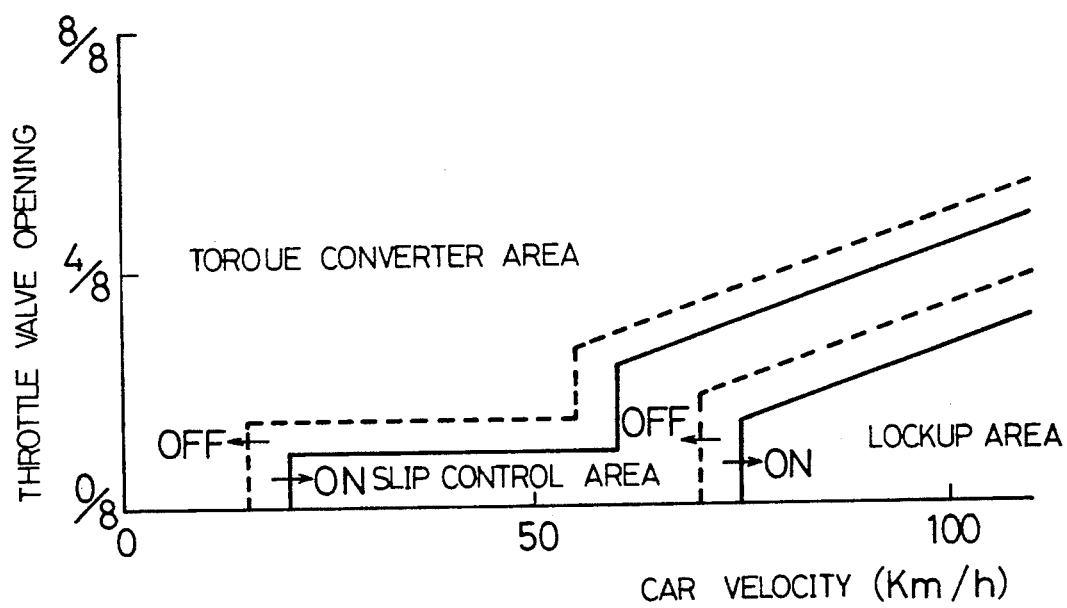

Then at the step $S_{S3}$, the change rate $\Delta$TVO of the throttle valve opening is compared with a positive set value C1 corresponding to the accelerating running and at the step $S_{S4}$, the above change rate is compared with a negative set value −C2 corresponding to the decelerating running. At the normal running or $-C2 \leq \Delta TVO \leq C1$, at the step $S_{S5}$ a basic lockup control pattern in FIG. 5 is selected and RETURN. At the accelerating running or C1<$\Delta$TVO, at the step $S_{S6}$ a timer is set at the specified time T so as to carry out control on the basis of the lockup control pattern corresponding to the accelerating running during the specified time T and at the step $S_{S7}$, a lockup control pattern with a larger torque converter area, a smaller lockup area and a smaller slip control area (as shown in FIG. 6) than those of the basic lockup control pattern is selected for the accelerating running and RETURN. By selecting the above pattern, the area of displaying torque increasing action of the torque converter 2 is expanded. Due to this torque increasing action by the torque converter 2, accelerability is improved.

Figure 7:
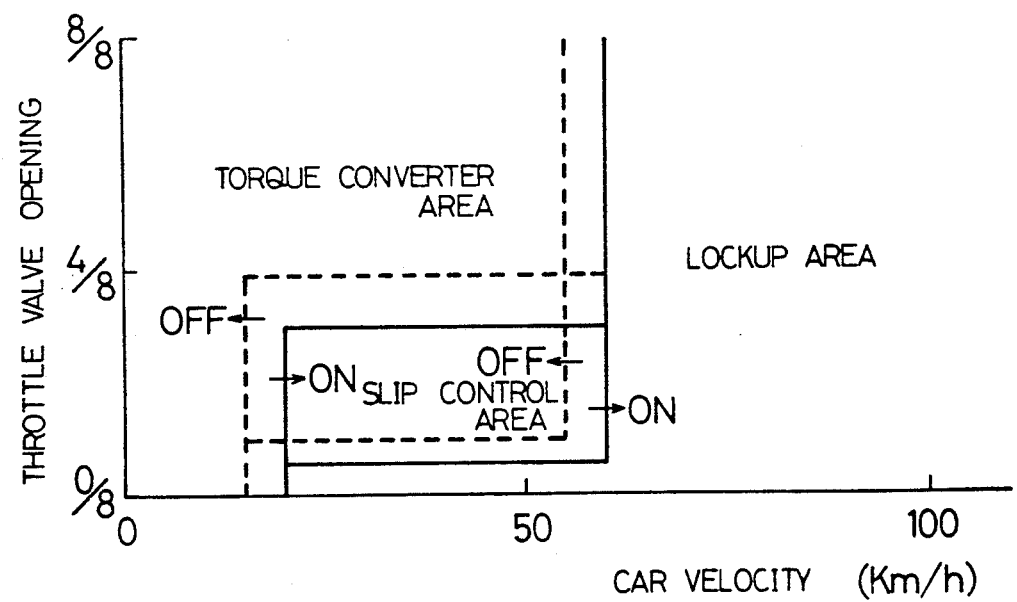

In the case of $\Delta TVO < -C2$ (the decelerating running) at the step $S_{S4}$, at the step $S_{S8}$ the timer is set at the specified time T so as to carry out control on the basis of the lockup control pattern corresponding to the decelerating running during the specified time T thereafter and at the step $S_{S9}$, a lockup control patter with a decreased torque converter area, a slip control area expanded in an increasing direction of the throttle valve opening and a lockup area which is set even at full closing of the throttle valve opening in addition to the normal area (as shown in FIG. 7), is selected for the decelerating running and RETURN. Thus, a control means 27 which carries out control on friction (including control on frictional force) and release of the lockup clutch 5 on the basis of the preset basic lockup control pattern in FIG. 5 by the steps $S_{S3}$–$S_{S5}$ of the control flow chart of switchover of lockup control pattern (FIG. 4) and the control flow chart in FIG. 3, is composed. Also, a load change detecting means 28 which detects the change of engine load by the change rate $\Delta$TVO of the throttle valve opening (by the step $S_{S2}$ of the switchover flow chart in FIG. 4) is composed. At the steps $S_{S4}$ and $S_{S9}$, when the change rate $\Delta$TVO of load detected by the load change detecting means 28 is more than the negative set value $-C2$ ($\Delta TVO < -C2$), the basic lockup control pattern of the control means 27 in FIG. 5 is changed over to the slip control pattern (in FIG. 7) and the part of torque converter area near the slip control area (in FIG. 5) is changed over to the slip control area so as to change the lockup control pattern in the direction where the area of large frictional force of the lockup clutch 5 expands. Thus, a lockup control pattern changing means 29 is composed.

An explanation is made below about the flow chart of setting a target slip quantity in FIG. 8.

At the step $S_{N1}$, the change rate $\Delta$TH ($\Delta$TH=THi−−THi−1) is calculated from the difference between the throttle valve opening of this time and that of the preceding time.

Figure 9:
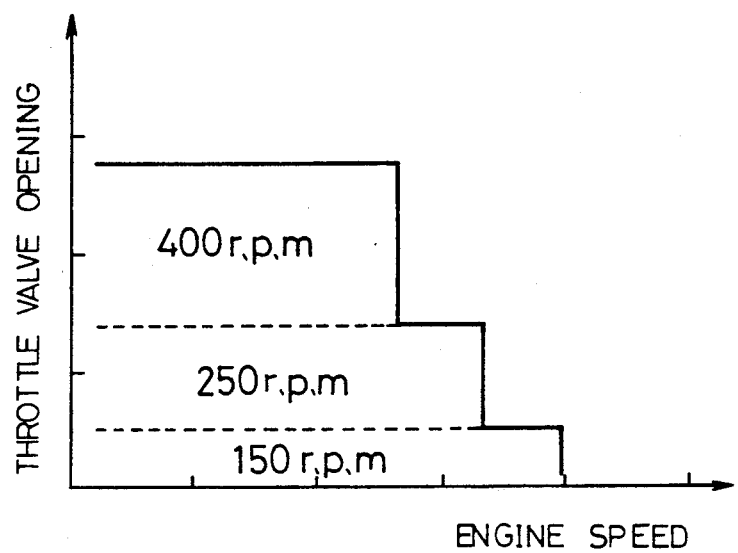
FIG. 9 shows a map of target slip quantities in relation to the engine speed (r.p.m.) and the throttle value opening at the accelerating running.

Then, at the step $S_{N2}$ the change rate $\Delta TH$ of the throttle valve opening is compared with a positive set value C3 corresponding to the accelerating running. In the case of $\Delta TH > C3$ (accelerating running), at the step $S_{N3}$ the timer is so set as to change the target slip quantity to the increasing side during the specified time T and at the step $S_{N4}$, a target slip quantity at the accelerating running corresponding to the engine speed and the throttle valve opening at that time is set, as shown in the target slip quantity map in FIG. 9. FIG. 9 shows that in the slip area the engine speed is set to 150 r.p.m., 250 r.p.m. and 400 r.p.m. at the small opening, medium opening and larger opening respectively of the throttle valve.

At the step $S_{N2}$, in the case where the accelerating running of $\Delta TH > C3$ continues, the above action is repeated but when the running becomes $\Delta TH \leq C3$, at the step $S_{N5}$ time counting of the timer is grasped in order to control frictional force by the target slip quantity $N_0$ at the accelerating running during the specified time T and before the lapse of timer counting $T \neq 0$, at the step $SN_6$ the timer counting is measured. Then, returning to the step $S_{N4}$, the target slip quantity is set accoding to r.p.m. of the engine and opening of the throttle valve at that time and on the basis of the target slip quantity map in FIG. 9 and RETURN.

On the other hand, at the step $S_{N5}$ in the case where the timer counting time has elapsed or in the case of normal running, at the step $S_{N7}$ a target slip quantity $N_0$ is set at the target slip quantity corresponding to the normal running (70 r.p.m., for example).

A control means 30 which controls the frictional force of the lockup clutch 5 so that the difference in r.p.m. (Ne−Nt) between the input shaft and the output shaft of the torque converter 2 in the slip area (in FIG. 5) becomes the set target slip quantity (70 r.p.m.) by the steps $S_1, S_2, S_4, S_6, S_{11}–S_{15}$ of the control flow chart in FIG. 3 and by the steps $S_{N2}, S_{N5}$ and $S_{N7}$ of the target slip quantity setting flow chart of FIG. 8, is composed. Load changing state detecting means 31 which detects the changing state of the engine by the change rate $\Delta TH$ of the throttle valve opening by the step $S_{N1}$ of the setting flow chart of FIG. 8, is composed. Target slip quantity changing means 32 which changes the target slip quantity $N_0$ of the control means 30 to the increasing side on the basis of the target slip quantity map for accelerating running of FIG. 9 when the change rate $\Delta TH$ of load detected by the load changing state detecting means 31 by the steps $S_{N2}–S_{N6}$ of the setting flow chart (FIG. 8) is more than set value C3, is composed.

Therefore, in the above embodiment, when the change rate of the throttle valve opening $\Delta TVO$ is less than $-C2$ ($\Delta TVO < -C2$) or at the decelerating running, the lockup control pattern is changed from the basic pattern of FIG. 5 over to the pattern for decelerating running of FIG. 7 and the slip control area is expanded. By this expansion of the slip control area, in the above basic lockup control pattern the lockup clutch 5 is controlled in frictional force even in the area which is controlled by the releasing side and as the engine brake force is transmitted through the lockup clutch 5, larger engine brake force can be transmitted in comparison with the case of transmitting the engine brake force only through the torque converter 2 and as a result, the desired decelerating running can be carried out and a driver will have good feeling of deceleration.

Moreover, at the decelerating running when fuel injecting to the engine from the fuel injecting device 17 is stopped (cutting off of fuel supply), transmission of larger engine brake force as mentioned above results in longer time of maintaining high engine and by this longer time the engine running state does not enter the fuel reverting area near the idle area but remains in the fuel supply cut off area. Thus, fuel supply cutting off time can be prolonged and fuel expense can be saved.

Figure 10:
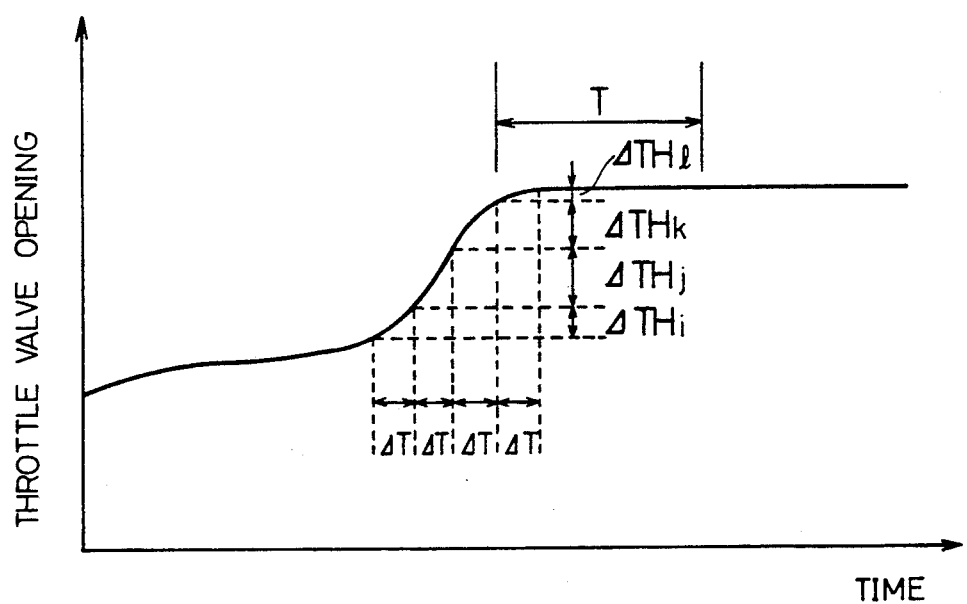
FIG. 10 is an explanatory drawing of working.

As shown in FIG. 10, at the accelerating running when the throttle valve opening increases from a small value, if the change rate $\Delta TH$ of the throttle valve opening during the unit time $\Delta t$ becomes $\Delta THi > C3$, the target slip quantity $N_0$ increases from 70 r.p.m. (normal running) to 250 r.p.m., for example, corresponding to the throttle valve opening at that time. Also, if the changes rate $\Delta TH$ of the throttle valve opening during the time counting time T becomes $\Delta THj > C3$, the target slip quantity $N_0$ is changed from 250 r.p.m. to 400 r.p.m. and thereafter, while $\Delta THk > C3$ is maintained, setting at 400 r.p.m. is held but if $\Delta THl$ becomes less than C3 ($\Delta THl < C3$), the target slip quantity $N_0$ returns to 70 r.p.m. (normal running) when the timer counted the time T. If $\Delta TH$ becomes larger than C3 ($\Delta TH > C3$) before the timer counts the time T, the target slip quantity at the accelerating running is maintained during the timer counts the time T and if it gets out of the slip area, control on frictional force of the lockup clutch 5 is released.

In the slip area, during the accelerating running of $\Delta TH > C3$ the target slip quantity $N_0$ is increased from 70 r.p.m. (normal running) to 150 r.p.m., 250 r.p.m. or 400 r.p.m. for accelerating running (in FIG. 9) and therefore, at the accelerating running the larger the throttle valve opening, the more the torque increasing action of the torque converter 2 is displayed. Thus, accelerating capacity is improved.

On the other hand, in the slip area during the normal running of $\Delta TH \leq C3$, the target slip quantity $N_0$ is kept small or at 70 r.p.m. for normal running and therefore it approaches the state of direct connection of the lockup clutch 5. Thus, loss of motive power due to slip of the torque converter 2 is decreased and fuel consumption can be saved.

In the above embodiment, the first invention is applied to the control on frictional force of the lockup clutch 5 ut it is a matter of course that this invention is applicable to the control of the lockup clutch 5 both in complete friction and complete releasing, without controlling friction force.

Figure 4:
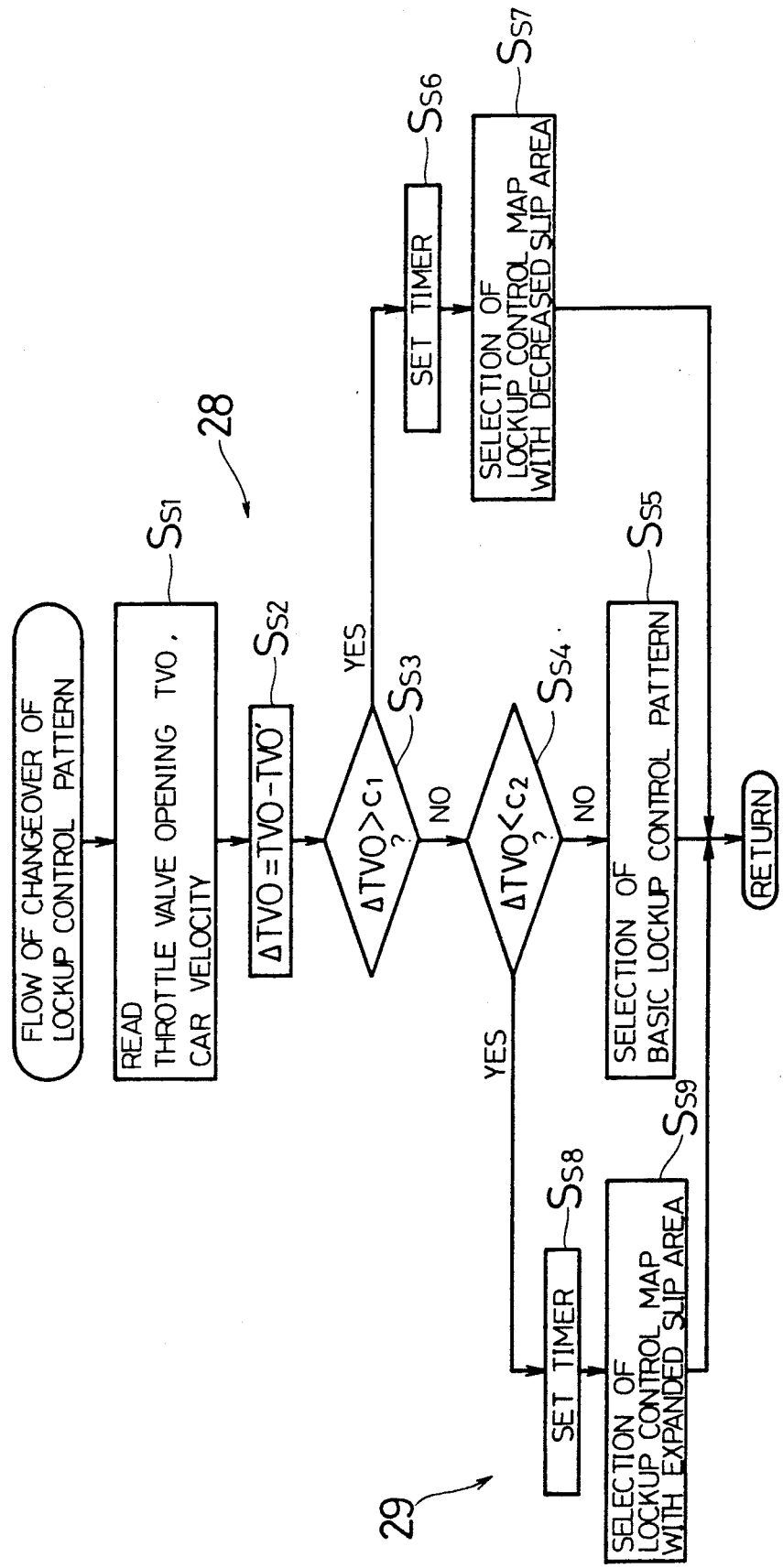
FIG. 4 is a flow chart showing the control on switchover of the lockup control pattern.

In the above embodiment, controls for changing the lockup control pattern and for expanding the target slip quantity are carried out separately (FIG. 4 and FIG. 8). Both controls may be carried out by one changing means

What is claimed is:

1. A lockup control device in a fluid transmission comprising:
   a lockup device which connects an input shaft directly with an output shaft of a fluid transmission;
   control means which controls engagement and release of said lockup device on the basis of a preset lockup control pattern wherein a lockup engaging region is predetermined in accordance with a vehicle driving condition;
   load changing state detecting means which detects a changing state of engine load; and lockup control pattern changing means which changes the lockup control pattern of said control means from said preset lockup control pattern to another lockup control pattern in which a lockup engaging region is expanded as compared with the lockup engaging region of said preset lockup control pattern;

wherein said lockup control pattern changing means changes the lockup pattern to said another lockup control pattern during a certain period of time under a limited deceleration condition wherein a change rate of the load detected by the load changing state detecting means exceeds a negative set value so that an engine brake force can be sufficiently applied during the certain period of time upon occurrence of such a limited deceleration condition even when the change rate of the load no longer exceeds the negative set value within the certain period of time.

2. A lockup control device in a fluid transmission as set forth in claim 1, wherein said lockup control pattern is provided with two kinds of control pattern, namely, a control pattern for normal running and a control pattern for decelerating running.

3. A lockup control device in a fluid transmission as set forth in claim 2, wherein a control pattern for decelerating running includes a slip area which extends for larger throttle value opening values in comparison with a control pattern for normal running, and wherein a lockup area is set to provide a lockup even in a condition when the throttle valve opening closes fully.

4. A lockup control device in a fluid transmission as set forth in claim 1, wherein the fluid transmission is connected to the engine and fuel injecting from a fuel injecting device to the engine is stopped when said load changing state detecting means detects that the change rate of load exceeds a negative set value.

5. A lockup control device in fluid transmission as set forth in claim 1, wherein said load changing state detecting means detects the changing state of the fluid transmission by the changes of the throttle valve opening.

6. A lockup control device in fluid transmission as set forth in claim 1, wherein said lockup device has an oil room on a friction side and an oil room on a release side and is provided with a lockup control valve to control releasing oil pressure which acts on said oil room on the release side, and a frictional force of said lockup device is controlled by controlling releasing oil pressure acting on said oil room on the release side by said lockup control valve on a basis of the change in actual slip quantity.

7. A lockup control device in fluid transmission as set forth in claim 1, wherein a slip area is set on the basis of car velocity and a throttle valve.

8. A lockup control device in a fluid transmission comprising:
a lockup device which connects an input shaft directly with an output shaft of a fluid transmission;
control means which controls frictional force of said lockup device so that the difference in the revolutional speeds between the input shaft and the output shaft of the fluid transmission becomes a target slip quantity in a set running area;
load changing state detecting means which detects the changing state of engine load; and
target slip quantity changing means which increases said target slip quantity of the control means during a certain period of time when the change rate of the load detected by the load changing state detecting means exceeds a positive set valve, so that torque increasing action of the torque converter can be sufficiently obtained during the certain period of time even where the change rate of the load becomes less than the positive set value during the certain period of time.

9. A lockup control device in a fluid transmission as set forth in claim 8, wherein the target slip quantity changing means stores a plurality of target slip quantities, and wherein target slip quantities are stored for corresponding ranges of throttle opening values, such that an increase in the target slip quantity by the target slip changing means is greater for ranges of larger throttle opening values.

10. A lockup control device in a fluid transmission as set forth in claim 9, wherein said target slip quantity changing means continues an increase of the target slip quantity during a specified time immediately after the change rate of load detected by said load changing state detecting means decreases below a set value.

11. A lockup control device in a fluid transmission as set forth in claim 9, wherein said target slip quantity changing means updates the target slip quantity over time with the magnitude of each target slip quantity depending upon throttle valve opening.

12. A lockup control device in a fluid transmission as set forth in claim 11, wherein said target slip quantity changing means continues the change of target slip quantity to the increasing side during the specified time immediately after the change rate of load detected by said load changing state detecting means decreases below a set value.

13. A lockup control device in a fluid transmission as set forth in claim 8, wherein said target slip quantity changing means updates the target slip quantity over time with the magnitude of each target slip quantity depending upon throttle valve opening.

14. A lockup control device in a fluid transmission as set forth in claim 13, wherein said target slip quantity changing means continues the change of target slip quantity to the increasing side during the specified time immediately after the change rate of load detected by said load changing state detecting means decreases below a set value.

15. A lockup control device in a fluid transmission as set forth in claim 8, wherein said target slip quantity changing means continues the change of target slip quantity to the increasing side during the specified time immediately after the change rate of load detected by said load changing state detecting means decreases below a set value.

16. A lockup control device in fluid transmission as set forth in claim 8, wherein said load changing state detecting means detects the changing state of the fluid transmission by the changes of the throttle valve opening.

17. A lockup control device in fluid transmission as set forth in claim 8, wherein said lockup device has an oil room on a friction side and an oil room on a release side and is provided with a lockup control valve to control releasing oil pressure which acts on said oil room on the release side, and a frictional force of said lockup device is controlled by controlling releasing oil pressure acting on said oil room on the release side by said lockup control valve on a basis in the change of actual slip quantity.

18. A lockup control device in fluid transmission as set forth in claim 8, wherein a slip area is set on the basis of car velocity and a throttle valve.

19. A lockup control device in a fluid transmission comprising:

a lockup device which connects an input shaft directly with an output shaft of a fluid transmission;

control means which controls engagement and release of said lockup device on the basis of a present lockup control pattern wherein a lockup engaging region is predetermined in accordance with a vehicle driving condition;

other control means which controls frictional force of said lockup device so that the difference in the revolutional speeds between the input shaft and the output shaft of the fluid transmission becomes a target slip quantity in a set running area;

load changing state detecting means which detects a changing state of engine load; and changing means which changes the lockup control pattern of said control means from said present lockup control pattern to another lockup control pattern in which a lockup engaging region is expanded as compared with the lockup engaging region of said present lockup control pattern;

said changing means changes the lockup pattern to said another lockup control pattern during a first certain period of time under a limited deceleration condition wherein the change rate of the load detected by the load changing state detecting means exceeds a negative set value so that an engine brake force can be sufficiently applied during the first certain period of time upon occurrence of such a limited deceleration condition, and change said target slip quantity of the control means to increase during a second certain period of time when the change rate of the load detected by the load changing state detecting means exceeds a positive set value, so that torque increasing action of the torque converter can be sufficiently obtained during the second certain perion of time even where the change rate of the load becomes less than the positive set value during the second certain period.

20. A lockup control device in a fluid transmission as set forth in claim 19, wherein said lockup control pattern is provided with two kinds of control pattern, namely, a control pattern for normal running and a control pattern for decelerating running.

21. A lockup control device in a fluid transmission as set forth in claim 20, wherein a control pattern for decelerating running includes a slip area which extends for larger throttle valve opening values, in comparison with a control pattern for normal running, and wherein a lockup area is set to provide a lockup even in a condition when the throttle valve opening closes fully.

22. A lockup control device in a fluid transmission as set forth in claim 19, wherein the target slip quantity changing means stores a plurality of target slip quantities, and wherein target slip quantities are stored for corresponding ranges of the throttle opening values, such that an increase in the target slip quantity by the target slip changing means is greater for range of larger throttle opening values.

23. A lockup control device in a fluid transmission as set forth in claim 19, wherein said target slip quantity changing means updates the target slip quantity over time with the magnitude of each target slip quantity depending upon throttle valve opening.

24. A lockup control device in a fluid transmission as set forth in claim 19, wherein said target slip quantity changing means continues an increase of the target slip quantity to during a specified time immediately after the change rate of load detected by said load changing state detecting means decreases below a set value.

* * * * *